United States Patent
Onoma

(10) Patent No.: US 11,867,372 B2
(45) Date of Patent: Jan. 9, 2024

(54) VEHICLE LIGHT GUIDE BODY AND VEHICLE LIGHTING UNIT

(71) Applicant: Ichikoh Industries, Ltd., Isehara (JP)

(72) Inventor: Kei Onoma, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/907,520

(22) PCT Filed: Mar. 26, 2021

(86) PCT No.: PCT/JP2021/013050
§ 371 (c)(1),
(2) Date: Sep. 27, 2022

(87) PCT Pub. No.: WO2021/200721
PCT Pub. Date: Oct. 7, 2021

(65) Prior Publication Data
US 2023/0144042 A1  May 11, 2023

(30) Foreign Application Priority Data
Mar. 31, 2020 (JP) .................................. 2020-063691

(51) Int. Cl.
*F21S 41/24* (2018.01)
*F21S 41/365* (2018.01)
(Continued)

(52) U.S. Cl.
CPC ................ *F21S 41/24* (2018.01); *B60Q 1/04* (2013.01); *F21S 41/147* (2018.01); *F21S 41/27* (2018.01);
(Continued)

(58) Field of Classification Search
CPC ........ F21S 41/147; F21S 41/148; F21S 41/24; F21S 41/285; F21S 41/322; F21S 43/235;
(Continued)

(56) References Cited

U.S. PATENT DOCUMENTS 10,451,239 B2   10/2019  Suwa et al.
2004/0156209 A1*  8/2004  Ishida .................. F21S 41/176
                                                  257/E33.059
(Continued)

FOREIGN PATENT DOCUMENTS

JP    2012-129002 A    7/2012
JP    2013-109871 A    6/2013
(Continued)

OTHER PUBLICATIONS

International Search Report dated Jun. 1, 2021 in PCT/JP2021/013050, filed on Mar. 26, 2021, 2 pages.

*Primary Examiner* — Colin J Cattanach
(74) *Attorney, Agent, or Firm* — Oblon, McClelland, Maier & Neustadt, L.L.P.

(57) ABSTRACT

A vehicle light guide body includes an incident surface that light from the light source enters, a first reflective surface that internally reflects the light that has entered from the incident surface to form nearly parallel light, a second reflective surface that internally reflects the light from the first reflective surface, a third reflective surface provided in a position located in front of the second reflective surface in a front-rear direction and in a portion in at least one of end faces in a left-right direction, a light shielding part that shields a part of the light reflected by the second reflective surface, and a light emitting surface that emits the light that has been internally reflected by the second reflective surface and has passed through the light shielding part to illuminate a headlight pattern in front of a vehicle.

8 Claims, 7 Drawing Sheets

(51) Int. Cl.

| | |
|---|---|
| *F21S 41/147* | (2018.01) |
| *F21S 41/27* | (2018.01) |
| *F21S 41/32* | (2018.01) |
| *F21S 41/43* | (2018.01) |
| *B60Q 1/04* | (2006.01) |
| *F21S 41/20* | (2018.01) |
| *F21S 43/20* | (2018.01) |
| *F21S 43/237* | (2018.01) |
| *F21S 43/249* | (2018.01) |
| *F21S 43/243* | (2018.01) |
| *F21S 43/31* | (2018.01) |
| *F21S 43/241* | (2018.01) |
| *F21S 43/239* | (2018.01) |
| *F21S 43/236* | (2018.01) |
| *F21S 43/242* | (2018.01) |
| *F21S 41/148* | (2018.01) |
| *F21S 43/247* | (2018.01) |
| *F21S 43/245* | (2018.01) |
| *F21S 43/251* | (2018.01) |
| *F21S 43/235* | (2018.01) |

(52) U.S. Cl.
CPC ............ *F21S 41/321* (2018.01); *F21S 41/322* (2018.01); *F21S 41/365* (2018.01); *F21S 41/43* (2018.01); *F21S 41/148* (2018.01); *F21S 41/285* (2018.01); *F21S 43/235* (2018.01); *F21S 43/236* (2018.01); *F21S 43/237* (2018.01); *F21S 43/239* (2018.01); *F21S 43/241* (2018.01); *F21S 43/242* (2018.01); *F21S 43/243* (2018.01); *F21S 43/245* (2018.01); *F21S 43/247* (2018.01); *F21S 43/249* (2018.01); *F21S 43/251* (2018.01); *F21S 43/26* (2018.01); *F21S 43/315* (2018.01)

(58) Field of Classification Search
CPC ...... F21S 43/236; F21S 43/237; F21S 43/239; F21S 43/241; F21S 43/242; F21S 43/243; F21S 43/245; F21S 43/247; F21S 43/249; F21S 43/251; F21S 43/26; F21S 43/315
See application file for complete search history.

(56) References Cited

U.S. PATENT DOCUMENTS

2016/0053967 A1\* 2/2016 Owada .................. F21S 41/147
362/520
2017/0343175 A1 11/2017 Owada

FOREIGN PATENT DOCUMENTS

| JP | 6130602 B2 | 5/2017 |
| JP | 2017-212068 A | 11/2017 |
| JP | 2018-60808 A | 4/2018 |

\* cited by examiner

VEHICLE LIGHT GUIDE BODY AND VEHICLE LIGHTING UNIT

TECHNICAL FIELD

The present invention relates to a vehicle light guide body and a vehicle lighting unit.

BACKGROUND ART

In recent years, for example, a configuration in which respective functions corresponding to a reflector, a shade, a projection lens, and the like are integrated into a single vehicle light guide body (see, for example, Patent Literature 1). That is, such a vehicle light guide body includes an incident part that light from a light source enters, an internal reflective part (corresponding to a reflector) that internally reflects light that has been entered, a light shielding part (corresponding to a shade) that shields a part of internally reflected light, and a light emitting part (corresponding to a projection lens) that emits light internally reflected and passing through the light shielding part to illuminate a headlight pattern in front of a vehicle.

CITATION LIST

Patent Literature

PTL 1: U.S. Pat. No. 6,130,602

SUMMARY OF THE INVENTION

Problems to be Solved by the Invention

The vehicle light guide body described in Patent Literature 1 is configured such that light controlled by the incident part is condensed to a focal point. For example, when fine light distribution control, for example, for low beam, is required, in a configuration in which light is controlled only by the incident part cannot finely control light distribution in some cases.

The present invention has been made in view of the foregoing, and it is an object of the present invention to provide a vehicle light guide body and a vehicle lighting unit that are capable of fine light distribution control.

Means for Solving the Problem

A vehicle light guide body according to the present invention includes an incident surface that light from a light source enters, a first reflective surface that internally reflects the light that has entered from the incident surface to form nearly parallel light, a second reflective surface that has a shape based on a paraboloid of revolution and internally reflects the light from the first reflective surface forward in a front-rear direction in an in-vehicle state, a third reflective surface provided in a position located in front of the second reflective surface in the front-rear direction and in a portion in at least one of end faces in a left-right direction in the in-vehicle state, a light shielding part that shields a part of the light reflected by the second reflective surface, and a light emitting surface that emits the light that has been internally reflected by the second reflective surface and has passed through the light shielding part to illuminate a headlight pattern in front of a vehicle, the second reflective surface has a diffusion pattern forming surface that reflects a part of the light from the first reflective surface toward the third reflective surface, and the third reflective surface internally reflects the light from the diffusion pattern forming surface toward the light emitting surface.

The third reflective surface may have a planar shape and may be formed such that a front side thereof in the front-rear direction is inclined inward in a horizontal direction.

The third reflective surface may have a light diffusion part that diffuses light.

The second reflective surface may have a light condensing pattern forming surface that internally reflects the light such that a part of the light from the first reflective surface passes through a focal point of the paraboloid of revolution and vicinity of the focal point.

The light condensing pattern forming surface may be disposed at center in the horizontal direction, and the diffusion pattern forming surface may be disposed in an outer side in the horizontal direction with respect to the light condensing pattern forming surface.

A plurality of the incident surfaces may be provided, the incident surfaces disposed in a central side in the left-right direction may be provided so as to correspond to the light condensing pattern forming surface, and the incident surfaces disposed in an outer side in the left-right direction may be provided so as to correspond to the diffusion pattern forming surface.

A vehicle lighting unit according to the present invention incudes a light source, and a plurality of the vehicle light guide bodies described above, each of the vehicle light guide bodies guiding and emitting light from the light source.

Effect of the Invention

According to the present invention, a vehicle light guide body and a vehicle lighting unit that are capable of fine light distribution control can be provided.

MODE FOR CARRYING OUT THE INVENTION

An embodiment of a vehicle light guide body and a vehicle lighting unit according to the present invention will be described below with reference to the accompanying drawings. The present invention is not limited to the embodiment described below. Components in the embodiment described below include a component that can be easily replaced by a person skilled in the art or substantially a same component. In the description described below, each of front-rear, up-down, and right-left directions is a direction in an in-vehicle state where a vehicle headlight is mounted on a vehicle and indicates a direction in which a travel direction of the vehicle is viewed from a driver's seat. In this embodiment, it is assumed that the up-down direction is parallel to the vertical direction and the right-left direction is the horizontal direction.

Figure 1:
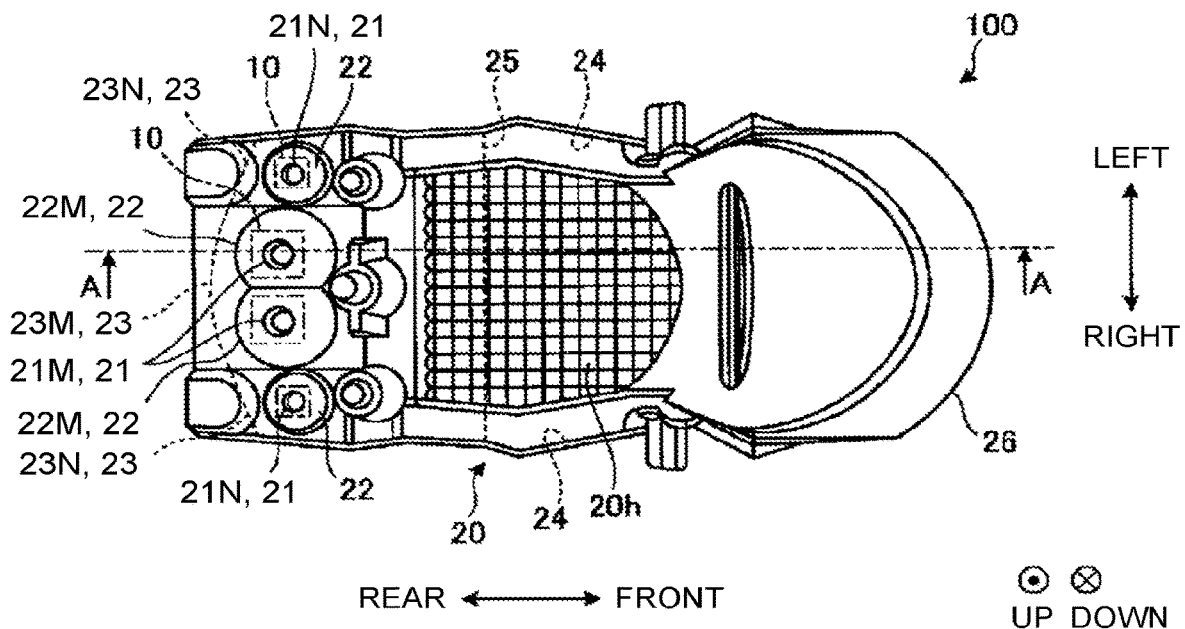
FIG. 1 is a plan view illustrating an example of a vehicle lighting unit according to an embodiment.
Figure 2:
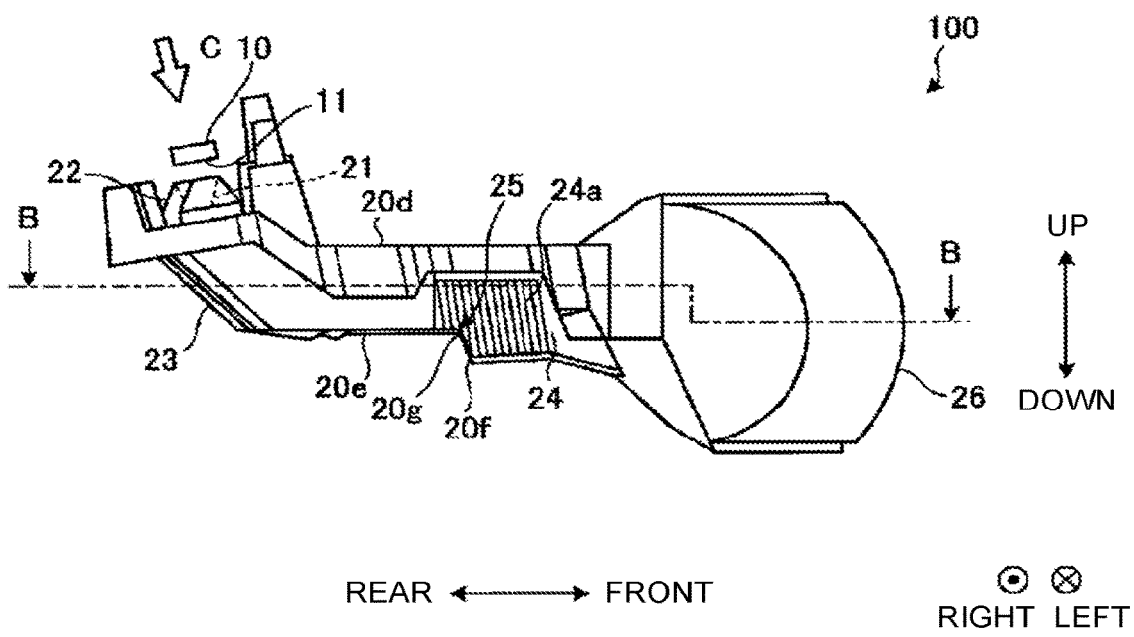
FIG. 2 is a side view illustrating the example of the vehicle lighting unit according to the embodiment.

FIG. 1 is a plan view illustrating an example of a vehicle lighting unit 100 according to this embodiment. FIG. 2 is a side view illustrating the example of the vehicle lighting unit 100 according to this embodiment.

The vehicle lighting unit 100 illuminates a headlight pattern PF (see FIG. 8) that will be described below in front of a vehicle. Using a low beam pattern as an example of the headlight pattern PF, this embodiment will be described. The vehicle lighting unit 100 has a light source 10 and a vehicle light guide body 20. The vehicle lighting unit 100 may further include another unit having a light source, a reflector, a shade, a projection lens, or the like. In this embodiment, a configuration of the vehicle lighting unit 100 mounted on a vehicle traveling on a road for right-side travel will be described as an example.

[Light Source]

As the light source 10, for example, a semiconductor light source is used. Such a semiconductor light source is, for example, an LED, an OLED, or the like. A luminescence surface 11 is disposed so as to face an incident surface 21 of the vehicle light guide body 20 that will be described later. The luminescence surface 11 is disposed in a state of being directed toward the vehicle light guide body 20. In this embodiment, a plurality of light sources 10, that is, for example, four light sources 10, are disposed in the left-right direction. The number of the light sources 10 is not limited to four, but may be three or less, and may be five or more.

[Vehicle Light Guide Body]

FIG. 2 is a side view illustrating an example of a vehicle light guide body. The vehicle light guide body 20 guides light from the light sources 10 and emits the light forward in the in-vehicle state. The vehicle light guide body 20 according to this embodiment has, for example, a configuration in which respective functions corresponding to a reflector, a shade, a projection lens, and the like in a known projector-type vehicle headlight are integrated. As illustrated in FIG. 1 and FIG. 2, the vehicle light guide body 20 includes an incident surface 21, a first reflective surface 22, a second reflective surface 23, a third reflective surface 24, a light shielding part 25, and a light emitting surface 26.

[Incident Surface]

A plurality of incident surfaces 21 are provided, for example, such that one light source is provided for each light source 10. The incident surfaces 21 may be provided so as not to be in a one-to-one correspondence with the light sources 10. For example, a plurality of incident surfaces 21 may be provided for one light source 10. The plurality of incident surfaces 21 are disposed side by side in the left-right direction in the in-vehicle state. Each of the incident surfaces 21 is formed, for example, in a truncated conical shape. In this embodiment, for example, four incident surfaces 21 are arranged. A diameter r2 of each of the incident surfaces 21 disposed in an outer side in the left-right direction is smaller than a diameter r1 of each of the incident surfaces 21 disposed in a central side in the left-right direction. In this embodiment, the diameter r2 of each of the two incident surfaces 21 disposed in the outer side in the left-right direction is smaller than the diameter r1 of each of the two incident surfaces 21 disposed in the central side in the left-right direction. A ratio between the diameter r1 and the diameter r2, that is, a ratio r1/r2, can be, for example, 0.5 or more and less than 1. Hereinafter, occasionally, the two incident surfaces 21 in the central side in the left-right direction are each written as a central incident surface 21M, the two incident surfaces in the outer side in the left-right direction are each written as an outer incident surface 21N, and both are distinguished from each other.

Each incident surface 21 has a first surface 21a and a second surface 21b. Light from each light source 10 enters the first surface 21a and the second surface 21b. The first surface 21a faces the luminescence surface 11. The first surface 21a is a flat surface or a convex surface protruding toward the light source 10. The second surface 21b is disposed in a lateral side of the light source 10 and is disposed in a cylindrical surface shape so as to surround the luminescence surface 11 and the first surface 21a of the light source 10.

[First Reflective Surface]

Each first reflective surface 22 internally reflects light that has entered from the incident surface 21 to form substantially parallel light. The first reflective surface 22 is disposed so as to surround the second surface 21b of the incident surface 21, and reflects light that has entered from the second surface 21b toward the second reflective surface 23. In this embodiment, the first reflective surfaces 22 are provided so as to correspond to the incident surfaces 21.

Figure 3:
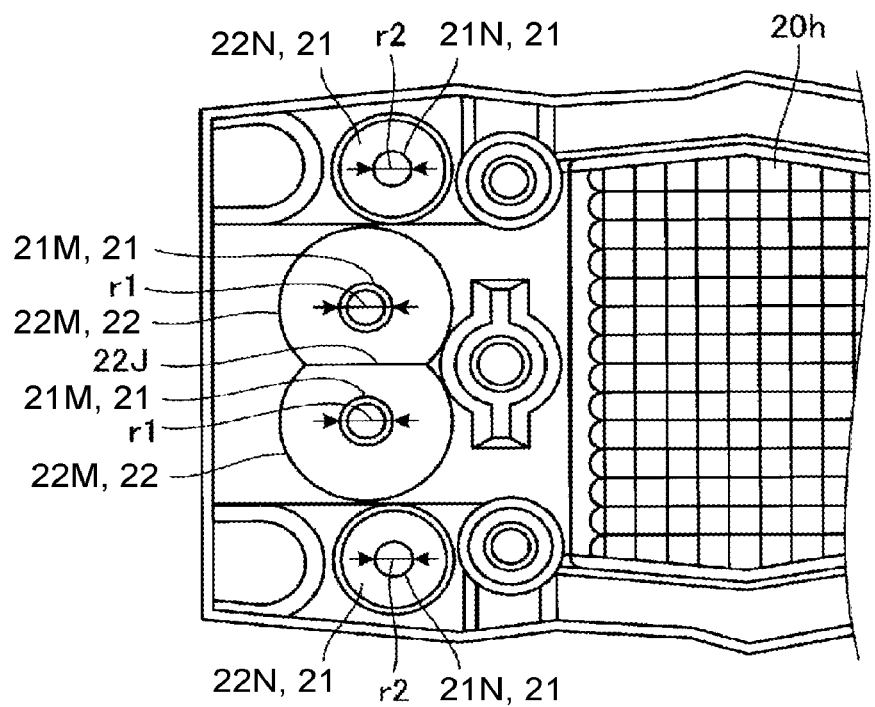
FIG. 3 is a view illustrating the example when viewed from a direction C in FIG. 2.

FIG. 3 illustrates the configuration when viewed from a direction of an arrow C in FIG. 2. As illustrated in FIG. 3, the two first reflective surfaces 22 disposed in the central side in the left-right direction partially overlap each other. Specifically, the two first reflective surfaces 22 are disposed so as to be connected in a straight line in a central portion 22J.

[Second Reflective Surface]

Figure 4:
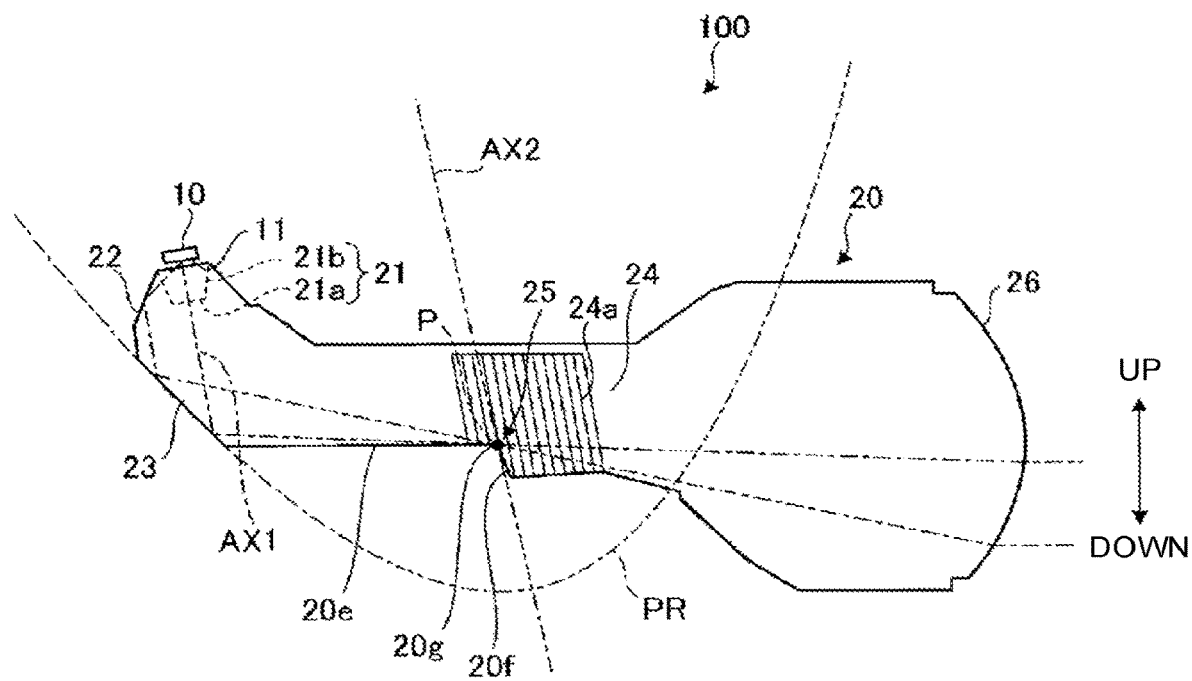
FIG. 4 is a view illustrating a configuration along a cross section taken along a line A-A in FIG. 1.

FIG. 4 is a view illustrating a configuration along a cross section taken along a line A-A in FIG. 1. As illustrated in FIG. 4, the second reflective surface 23 has a shape based on a paraboloid of revolution PR. The second reflective surface 23 has a focal point P. The focal point P is disposed in a position in vicinity of a focal point of the light emitting surface 26 that will be described later. The second reflective surface 23 reflects light from the first reflective surface 22 toward the focal point P, that is, in front of the vehicle. The second reflective surface 23 has an axis AX2 that is in parallel to an optical axis AX1 of light that is reflected by the first reflective surface 22 and internally reflects light toward the focal point P of the paraboloid of revolution PR.

Figure 5:
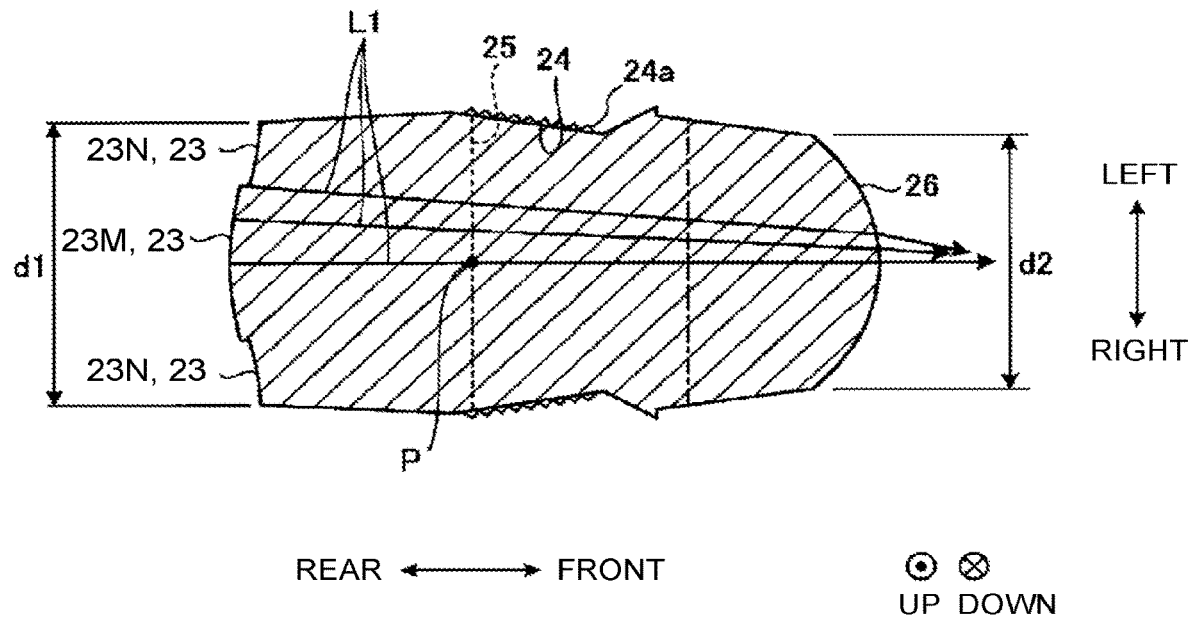
FIG. 5 is a view illustrating a configuration along a cross section taken along a line B-B in FIG. 2.

FIG. 5 is a view illustrating a configuration along a cross section taken along a line B-B in FIG. 2. As illustrated in FIG. 5, in this embodiment, a plurality of second reflective surfaces 23 are disposed side by side in the left-right direction in an in-vehicle state. The plurality of second reflective surfaces 23 include a light condensing pattern forming surface 23M and a diffusion pattern forming surface 23N.

As illustrated in FIG. 5, the light condensing pattern forming surface 23M internally reflects the light so that the light passes through the focal point P and the vicinity of the focal point P. Of the plurality of second reflective surfaces 23, the second reflective surface 23 disposed in a vertical direction with respect to the optical axis AX1 of the light source 10 in the in-vehicle state is the light condensing pattern forming surface 23M. The light condensing pattern forming surface 23M is disposed at center in the left-right direction. The light condensing pattern forming surface 23M is disposed so as to correspond to the two central incident surfaces 21M. The light condensing pattern forming surface 23M reflects light that has entered the two central incident surfaces 21M and has been reflected by the first reflective surface 22.

The diffusion pattern forming surface 23N reflects a part of light from the first reflective surface 22 toward the third reflective surface 24 that will be described later. Therefore, the diffusion pattern forming surface 23N has, for example, a shape in which an end portion thereof located closer to the light condensing pattern forming surface 23M in the left-right direction is deformed forward with respect to a shape based on the paraboloid of revolution PR. One diffusion pattern forming surface 23N is disposed in each of outer sides of the light condensing pattern forming surface 23M in the left-right direction. The diffusion pattern forming surface 23N is disposed so as to correspond to each outer incident surface 21N. The diffusion pattern forming surface 23N reflects light that has entered each outer incident surface 21N and has been reflected by the first reflective surface 22. A path of light on the diffusion pattern forming surface 23N will be described later.

[Third Reflective Surface]

The third reflective surface 24 is provided in a position located in front of the second reflective surface 23 and in a portion in each of end faces on both sides in the left-right directions. The third reflective surface 24 internally reflects light reflected by the diffusion pattern forming surface 23N. The third reflective surface 24 internally reflects light from the diffusion pattern forming surface 23N toward the light emitting surface 26. For example, the third reflective surface 24 has a planar shape and is formed such that a front side thereof is inclined inward in the horizontal direction. The third reflective surface 24 is disposed in a position where the reflective surface 24 is connected to both ends of a light shielding part 25 that will be described later in the left-right direction. The third reflective surface 24 has a light diffusion part 24a that diffuses light. The light diffusion part 24a diffuses light reflected by the third reflective surface 24 in the horizontal direction.

Figure 6:
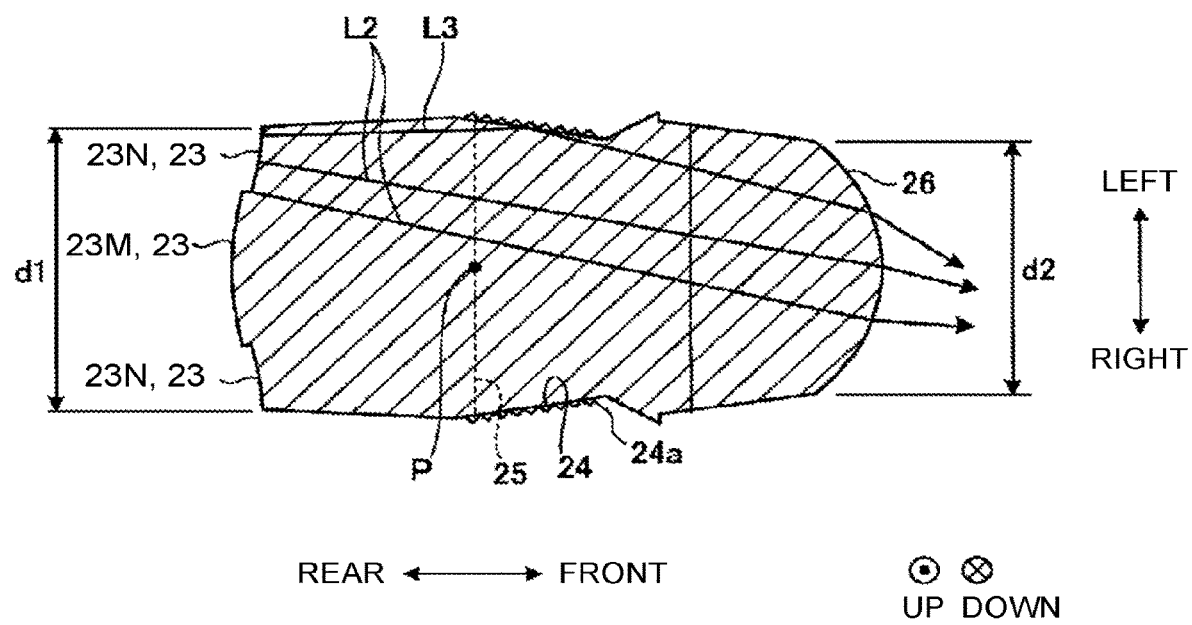
FIG. 6 is a view illustrating the configuration along the cross section taken along the line B-B in FIG. 2.

FIG. 6 is a view illustrating the configuration along the cross section taken along the line B-B in FIG. 2. As illustrated in FIG. 6, the diffusion pattern forming surface 23N reflects a part of light from the first reflective surface 22 toward the third reflective surface 24. Light reflected by the diffusion pattern forming surface 23N reaches the third reflective surface 24. The third reflective surface 24 internally reflects the light toward the light emitting surface 26. Thus, reflection of all light inside the vehicle light guide body 20 on the light emitting surface 26 can be suppressed.

[Light Shielding Part]

The light shielding part 25 shields a part of light internally reflected by the second reflective surface 23 and the third reflective surface 24. For example, as illustrated in FIG. 2, the light shielding part 25 has a bent shape such that surfaces 20e and 20f of the vehicle light guide body 20 disposed in a lower position in the in-vehicle state form a corner 20g. The surface 20e is formed along a horizontal plane. The surface 20f is formed so as to be, for example, inclined downward in a forward direction. The corner 20g has a recessed shape when the vehicle light guide body 20 is viewed from outside (from bottom) and protrudes toward an inside of the vehicle light guide body 20. The corner 20g linearly extends in the left-right direction. The light shielding part 25 forms, for example, a cutoff line Pc of the headlight pattern that will be described later at the corner 20g. The cutoff line Pc includes a horizontal cutoff line and a diagonal cutoff line. In this case, the corner 20g has a horizontal portion (not illustrated) to form the horizontal cutoff line and an inclined portion (not illustrated) to form the diagonal cutoff line.

The light shielding part 25 is provided in an area including the corner 20g. For example, the light shielding part 25 may shield light by refracting or internally reflecting light that reaches the light shielding part 25 in a direction different from a direction of the light emitting surface 26 and may shield light by disposing a light absorbing layer in a portion of the surface 20e including the corner 20g corresponding to the light shielding part 25 in advance to cause the light absorbing layer to absorb light. The light internally reflected or refracted by the light shielding part 25 is emitted to outside of the vehicle light guide body 20 and is absorbed by an inner housing or the like disposed outside the vehicle light guide body 20.

[Light Emitting Surface]

The light emitting surface 26 emits light that has been internally reflected by the second reflective surface 23 and has passed through the light shielding part 25 to illuminate the headlight pattern PF (see FIG. 8) in front of the vehicle. The light emitting surface 26 has, for example, a curved shape. The light emitting surface 26 has an unilluminated focal point and an optical axis. The focal point of the light emitting surface 26 is disposed in a position in the vicinity of the focal point P of the second reflective surface 23.

A prism 20h is formed on an upper surface 20d of the vehicle light guide body 20. The prism 20h diffuses the light internally reflected by the second reflective surface 23. Thus, the light emitted from the upper surface to the outside of the vehicle light guide body 20 can be prevented from becoming glare.

[Operation]

Figure 7:
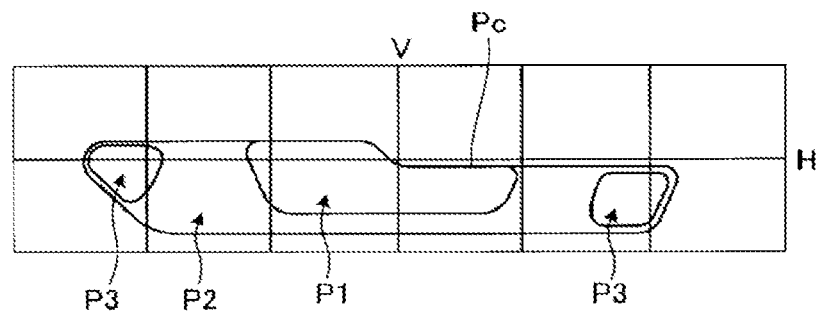
FIG. 7 is a diagram illustrating an example of a light condensing pattern and a diffusion pattern illuminated on a virtual screen in front of a vehicle.
Figure 8:
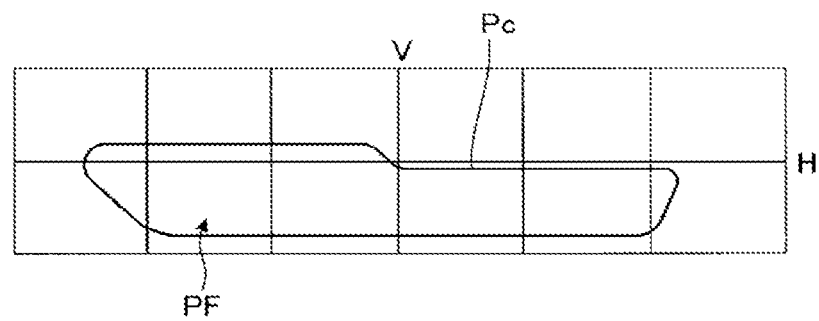
FIG. 8 is a diagram illustrating an example of a headlight pattern illuminated on a virtual screen in front of a vehicle.

Next, an operation of the vehicle lighting unit 100 configured in a manner described above will be described. FIG. 7 is a diagram illustrating an example of a light condensing pattern and a diffusion pattern illuminated on a virtual screen in front of a vehicle. FIG. 8 is a diagram illustrating an example of a headlight pattern illuminated on a virtual screen in front of a vehicle. Each of FIG. 7 and FIG. 8 illustrates a pattern corresponding to a vehicle travelling on a left side of a road. For a vehicle travelling on a right side of a road, a pattern obtained by laterally reversing the pattern illustrated in each of FIG. 7 and FIG. 8 may be illuminated. In each of FIG. 7 and FIG. 8, a line V-V indicates a vertical line of the screen and a line H-H indicates a horizontal line of the screen laterally extending. Herein, an intersection of the vertical line and the horizontal line is assumed to be a reference position in the horizontal direction.

By turning on each of the light sources 10 in the vehicle lighting unit 100, light is emitted from the luminescence surface 11. Of the light, light that has entered the first surface 21a of the incident surface 21 is formed into nearly parallel light by the first surface 21a. Light that has entered the second surface 21b of the incident surface 21 is internally reflected by the first reflective surface 22 and becomes nearly parallel light. The light formed in a manner described above is internally reflected toward the light emitting surface 26 on the second reflective surface 23.

For example, light L1 that has entered from the central incident surface 21M, has been internally reflected by the first reflective surface 22, and has become nearly parallel light is, as illustrated in FIG. 5, internally reflected by the light condensing pattern forming surface 23M, passes through the focal point P and the vicinity of the focal point P in the light shielding part 25, and is emitted from the light emitting surface 26. The light L1 forms a light condensing pattern P1 in front of the vehicle, as illustrated in FIG. 7.

Each of light L2 and light L3 that has entered from the outer incident surface 21N, has been internally reflected by the first reflective surface 22, and has become nearly parallel light is internally reflected internally reflected by the diffusion pattern forming surface 23N in the cross section taken along the line B-B in FIG. 2, that is, a cross section (transverse plane) parallel to the horizontal plane, as illustrated in FIG. 6. The light L2 internally reflected by the diffusion pattern forming surface 23N passes through the focal point P and a position that is shifted horizontally outward from the focal point P in the in-vehicle state in the light shielding part 25 and is emitted from the light emitting surface 26. The light L2 forms a diffusion pattern P2 in front of the vehicle, as illustrated in FIG. 7. The light L3 internally reflected by the diffusion pattern forming surface 23N reaches the third reflective surface 24 on a side closer to the light emitting surface 26 than the light shielding part 25 and is internally reflected by the third reflective surface 24. When the light L3 is internally reflected by the third reflective surface 24, the light L3 is diffused horizontally by the light diffusion part 24a provided on the third reflective surface 24. The light L3 internally reflected by the third reflective surface 24 reaches the light emitting surface 26. The light L3 that has reached the light emitting surface 26 is emitted from the light emitting surface 26 to the front of the vehicle. The light L3 forms a diffusion pattern P3 in front of the vehicle, as illustrated in FIG. 7. The diffusion patterns P2 and P3 are formed so as to spread out in the left-right direction, as compared to the light condensing pattern P1. The light L3 is diffused by the light diffusion part 24a of the third reflective surface 24, and therefore, an outline of the diffusion pattern P3 is prevented from becoming clear. Therefore, the diffusion pattern P3 can be formed so as to be blended in with surroundings thereof. In FIG. 6, an example is illustrated using the light L2 and the light L3 internally reflected by the diffusion pattern forming surface 23N in an upper side of FIG. 6, but the light internally reflected by the diffusion pattern forming surface 23N in a lower side of FIG. 6 is also included in the light L2 and the light L3 in a similar manner. That is, the light L2 and the light L3 include light internally reflected by the diffusion pattern forming surfaces 23N in both the upper and lower sides of FIG. 6.

Therefore, when each light source 10 of the vehicle lighting unit 100 is turned on, as illustrated in FIG. 8, the headlight pattern PF in which the light condensing pattern P1 and the diffusion patterns P2 and P3 are superimposed is formed in front of the vehicle. Thus, the headlight pattern PF with a luminous intensity properly adjusted on inner and outer sides in the left-right direction is formed in front of the vehicle.

In the description above, the configuration in which the light sources 10 each of which causes light to enter a corresponding one of the two central incident surfaces 21M and the two outer incident surfaces 21N are disposed is employed, but the present invention is not limited thereto. For example, a configuration in which only the light sources 10 that cause light to enter the two central incident surfaces 21M are disposed and the light sources 10 that cause light to enter the two outer incident surfaces 21N are not disposed may be employed. In this case, light from the light sources 10 enters only the two central incident surfaces 21M, so that only the light condensing pattern P1 is formed by the vehicle light guide body 20. A configuration in which only the light sources 10 that cause light to enter the two outer incident surfaces 21N are disposed and the light sources 10 that cause light to enter the two central incident surfaces 21M are not disposed may be employed. In this case, light from the light sources 10 enters only the two outer incident surfaces 21N, so that only diffusion patterns P2 and P3 are formed by the vehicle light guide body 20. With this combination, the lens members can be made common for a plurality of light distribution patterns by disposing units that fulfill a function as a headlight as appropriate, and therefore, costs can be reduced.

Figure 9:
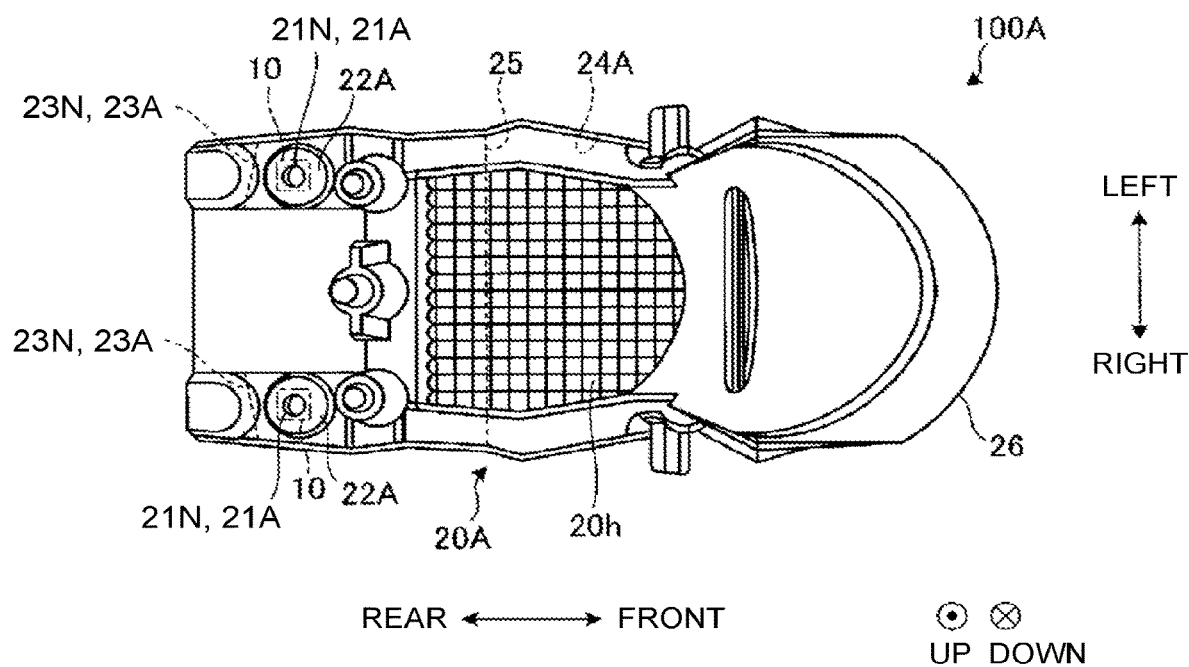
FIG. 9 is a view illustrating a vehicle lighting unit according to another example.

FIG. 9 is a view illustrating a vehicle lighting unit 100A according to another example. As illustrated in FIG. 9, the vehicle lighting unit 100A includes the light sources 10 and a vehicle light guide body 20A. The vehicle light guide body 20A includes outer incident surfaces 21N disposed in left and right outer sides in the left-right direction, a first reflective surface 22A, a second reflective surface 23A, and a third reflective surface 24A that correspond to each of the outer incident surfaces 21N. The second reflective surface 23A is the diffusion pattern forming surface 23N. In contrast to the configuration of the vehicle light guide body 20 illustrated in FIG. 1 or the like, the vehicle light guide body 20A has a configuration in which the central incident surface 21M disposed in the central side of the vehicle in the left-right direction and the first reflective surface 22 and the second reflective surface 23 (light condensing pattern forming surface 23M) corresponding to the central incident surface 21M are not provided. Therefore, light that enters the vehicle light guide body 20A from the light sources 10 forms the diffusion patterns P2 and P3 in front of the vehicle. As described above, the vehicle light guide body 20A is a diffusion light guide body in which all the second reflective surfaces 23A serve as the diffusion pattern forming surfaces 23N and form the diffusion patterns P2 and P3 in front of the vehicle. Other configurations of the vehicle light guide body (diffusion light guide body) 20A are similar to those of the vehicle light guide body 20 described above.

Figure 10:
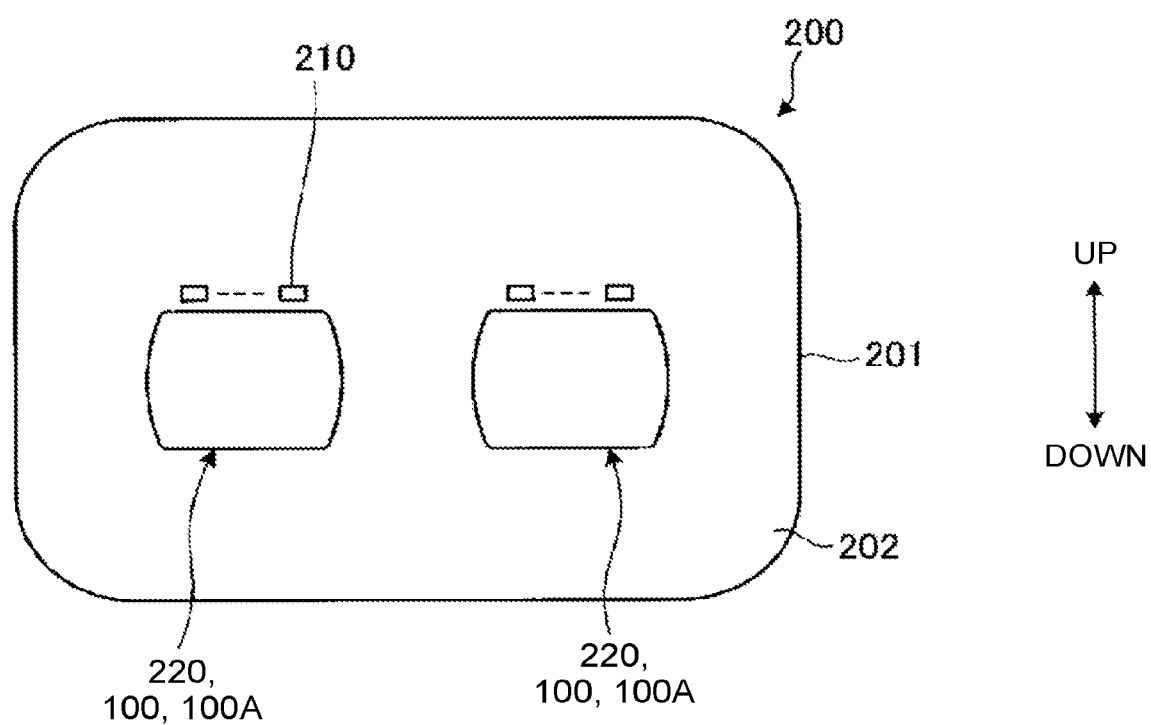
FIG. 10 is a view illustrating an example of a vehicle light according to the embodiment.

FIG. 10 is a view illustrating an example of a vehicle light 200 according to the present invention. FIG. 10 illustrates the example when viewed from a front side in the in-vehicle state. The vehicle light 200 illustrated in FIG. 10 includes a housing 201, an outer lens 202, a light source 210, and a plurality of vehicle light guide bodies 220. The vehicle light 200 has a configuration in which, for example, two vehicle light guide bodies 220 are disposed in a light chamber surrounded by the housing 201 and the outer lens 202 herein. The number of the vehicle light guide bodies 220 to be disposed in the lamp chamber may be one or three or more. An arrangement of the vehicle light guide bodies 220 is not limited to an arrangement in which the vehicle light guide bodies 220 are disposed side by side in the left-right direction as viewed from the front, may be an arrangement in which the vehicle light guide bodies 220 are disposed in the up-down direction, may be an arrangement in which the vehicle light guide bodies 220 are disposed in an oblique direction, and may be an arrangement in which the vehicle light guide bodies 220 are disposed in directions of combination of two or more of the left-right direction, the up-down direction, and the oblique direction. Each of the vehicle light guide bodies 220 can be configured such that, of the vehicle light guide bodies 20 and 20A described above, vehicle light guide bodies of the same type or different types are combined and thus disposed. In addition, at least one of the vehicle light guide bodies 220 may be the vehicle light guide body 20 or 20A and the other ones thereof may be vehicle light guide bodies each having some other configuration.

As described above, the vehicle light guide body 20 according to this embodiment includes the incident surface 21 that light from the light source 10 enters, the first reflective surface 22 that internally reflects light that has entered from the incident surface 21 to form nearly parallel light, the second reflective surface 23 that has a shape based on a paraboloid of revolution PR and internally reflects the light from the first reflective surface 22 forward in the front-rear direction in the in-vehicle state, the third reflective surface 24 provided in a position located in front of the second reflective surface 23 in the front-rear direction and in a portion in at least one of end faces in the left-right direction in the in-vehicle state, the light shielding part 25 that shields a part of the light reflected by the second reflective surface 23, and the light emitting surface 26 that emits the light that has been internally reflected by the second reflective surface 23 and has passed through the light shielding part 25 to illuminate the headlight pattern in front of the vehicle, the second reflective surface 23 has the diffusion pattern forming surface 23N that reflects a part of the light from the first reflective surface 22 toward the third reflective surface 24, and the third reflective surface 24 internally reflects the light from the diffusion pattern forming surface 23N toward the light emitting surface 26.

According to this configuration, light distribution can be controlled on the second reflective surface 23, and therefore, fine control of light distribution than that, for example, in a configuration in which light distribution is controlled only at an incident part. Thus, appropriate light distribution control can be performed even when fine light distribution control, for example, for low beam, is required. Moreover, the third reflective surface 24 internally reflects light from the diffusion pattern forming surface 23N such that the light reaches the light emitting surface 26 by a total reflection angle or more with respect to the light emitting surface 26, so that it is possible to prevent all light from being reflected inside the vehicle light guide body 20 on the light emitting surface 26. Therefore, light from the light sources can be contributed to pattern illumination without waste.

In the vehicle light guide body 20 according to this embodiment, the third reflective surface 24 may have a planar shape and may be formed such that the front side thereof in the front-rear direction is inclined inward in the horizontal direction. Thus, light can be caused to reach the light emitting surface 26 by an angle with respect to the emitting surface 26.

In the vehicle light guide body 20 according to this embodiment, the third reflective surface 24 may have a light diffusion part 24a that diffuses light. Thus, the outline of the diffusion pattern P3 is prevented from becoming clear and the diffusion pattern P3 can be formed so as to be blended in with surroundings thereof.

In the vehicle light guide body 20 according to this embodiment, the second reflective surface 23 may have the light condensing pattern forming surface 23M that internally reflects light from the first reflective surface 22 such that a part of the light passes through a focal point of the paraboloid of revolution PR and vicinity of the focal point. By providing the light condensing pattern forming surface 23M and the diffusion pattern forming surface 23N in one vehicle light guide body 20, one or both of the light condensing pattern P1 and the diffusion patterns P2 and P3 can be formed by one vehicle light guide body 20.

In the vehicle light guide body 20 according to this embodiment, the light condensing pattern forming surface 23M may be disposed in center in the horizontal direction and the diffusion pattern forming surface 23N may be disposed in an outer side in the horizontal direction with respect to the light condensing pattern forming surface. By disposing the light condensing pattern forming surface 23M in the central side in the left-right direction, it is easier to condense light at the focal point P and in the vicinity of the focal point P than, for example, when the light condensing pattern forming surface 23M is disposed in the outer side in the left-right direction, and therefore, the light condensing pattern P1 can be easily formed. By disposing the diffusion pattern forming surface 23N in the outer side in the left-right direction, it is easier to diffuse light in the left-right direction than, for example, when the diffusion pattern forming surface 23N is disposed in the central side in the left-right direction, and therefore, the diffusion patterns P2 and P3 can be easily formed.

In the vehicle light guide body 20 according to this embodiment, a plurality of incident surfaces 21 may be provided, the incident surfaces 21 disposed in the central side in the left-right direction may be provided so as to correspond to the light condensing pattern forming surface 23M, and the incident surfaces 21 disposed in the outer side in the left-right direction may be provided so as to correspond to the diffusion pattern forming surface 23N. Thus, light that has entered from the incident surfaces 21 can be precisely controlled.

The vehicle lighting unit 100 according to this embodiment includes the light source 210 and the plurality of above-described vehicle light guide bodies 220 that guide and emit light from the light source 210. According to this configuration, the vehicle lighting unit 100 as a whole can obtain a headlight pattern formed by combining illumination patterns of the plurality of vehicle light guide bodies 220.

The technical scope of the present invention is not limited to the above-described embodiment, and changes can be made as appropriate without departing from the gist of the present invention. In the above-described embodiment, the configuration of the vehicle lighting unit 100 that is mounted on a vehicle traveling on a road for right-side travel has been described as an example, but the present invention is not limited thereto and similar applies to a case where a vehicle headlight is mounted on a vehicle traveling on a road for left-side travel.

In the above-described embodiment, the description has been made using the low beam pattern as an example of the headlight pattern PF, but the present invention is not limited thereto and may be any other pattern, for example, a high beam pattern or the like. In the vehicle light 200 provided with the plurality of vehicle light guide bodies 220 therein, the vehicle light guide bodies 220 that form patterns of different types may be provided.

DESCRIPTION OF REFERENCE NUMERALS

AX1 Optical axis
AX2 Axis
L1, L2, L3 Light
P Focal point
P1 Light condensing pattern
P2, P3 Diffusion pattern
Pc Cutoff line
PF Headlight pattern
PR Paraboloid of revolution
r1, r2 Diameter
10, 210 Light source
11 Luminescence surface
20, 20A, 220 Vehicle light guide body
20d Upper surface
20e, 20f Surface 20g Corner
20h Prism
21 Incident surface
21M Central incident surface
21N Outer incident surface
21a First surface
21b Second surface
22, 22A First reflective surface
22J Central portion
23, 23A Second reflective surface
23M Light condensing pattern forming surface
23N Diffusion pattern forming surface
24, 24A Third reflective surface
24a Light diffusion part
25 Light shielding part
26 Light emitting surface
100, 100A Vehicle lighting unit
200 Vehicle light
201 Housing
202 Outer lens

The invention claimed is:

1. A vehicle light guide body, comprising:
an incident surface that light from a light source enters;
a first reflective surface that internally reflects the light that has entered from the incident surface to form nearly parallel light;
a second reflective surface that has a shape based on a paraboloid of revolution and internally reflects the light from the first reflective surface forward in a front-rear direction in an in-vehicle state;
a third reflective surface provided in a position located in front of the second reflective surface in the front-rear direction and in a portion in at least one of end faces in a left-right direction in the in-vehicle state;
a light shielding part that shields a part of the light reflected by the second reflective surface; and
a light emitting surface that emits the light that has been internally reflected by the second reflective surface and has passed through the light shielding part to illuminate a headlight pattern in front of a vehicle, wherein
the second reflective surface has a diffusion pattern forming surface that reflects a part of the light from the first reflective surface toward the third reflective surface, and
the third reflective surface internally reflects the light from the diffusion pattern forming surface toward the light emitting surface,
the second reflective surface has a light condensing pattern forming surface that internally reflects the light which has been reflected by the first reflective surface such that a part of the light from the first reflective surface passes through a focal point of the paraboloid of revolution and a vicinity of the focal point,
the light condensing pattern forming surface is disposed at a center in the left-right direction, and
the diffusion pattern forming surface is disposed in an outer side in the left-right direction with respect to the light condensing pattern forming surface.

2. The vehicle light guide body according to claim 1, wherein the third reflective surface has a planar shape and is formed such that a front side thereof in the front-rear direction is inclined inward in the left-right direction.

3. The vehicle light guide body according to claim 1, wherein the third reflective surface has a light diffusion part that diffuses the light reflected by the third reflective surface.

4. The vehicle light guide body according to claim 1, wherein
a plurality of the incident surfaces are provided,
the incident surfaces disposed in a central side in the left-right direction are provided so as to correspond to the light condensing pattern forming surface, and
the incident surfaces disposed in the outer side in the left-right direction are provided so as to correspond to the diffusion pattern forming surface.

5. A vehicle lighting unit, comprising:
a light source; and
a plurality of the vehicle light guide bodies according to claim 1, each of the vehicle light guide bodies guiding and emitting light from the light source.

6. The vehicle light guide body according to claim 1, wherein the left-right direction is a horizontal direction.

7. A vehicle light guide body, comprising:
an incident surface that light from a light source enters;
a first reflective surface that internally reflects the light that has entered from the incident surface;
a second reflective surface that has a shape based on a paraboloid of revolution and internally reflects the light from the first reflective surface forward in a front-rear direction in an in-vehicle state;
a third reflective surface provided in a position located in front of the second reflective surface in the front-rear direction and in a portion in at least one of end faces in a left-right direction in the in-vehicle state;
a light shielding part that shields a part of the light reflected by the second reflective surface; and
a light emitting surface that emits the light that has been internally reflected by the second reflective surface and has passed through the light shielding part to illuminate a headlight pattern in front of a vehicle, wherein
the second reflective surface has a diffusion pattern forming surface that reflects a part of the light from the first reflective surface toward the third reflective surface, and
the third reflective surface internally reflects the light from the diffusion pattern forming surface toward the light emitting surface,
the second reflective surface has a light condensing pattern forming surface that internally reflects the light which has been reflected by the first reflective surface such that a part of the light from the first reflective surface passes through a focal point of the paraboloid of revolution and a vicinity of the focal point,
the light condensing pattern forming surface is disposed at a center in the left-right direction, and
the diffusion pattern forming surface is disposed in an outer side in the left-right direction with respect to the light condensing pattern forming surface.

8. The light guide body according to claim 7, wherein the left-right direction is a horizontal direction.

* * * * *